Patented Mar. 31, 1931

1,798,968

UNITED STATES PATENT OFFICE

FRANK M. CLARK AND ARTHUR T. HARDING, OF PITTSFIELD, MASSACHUSETTS, ASSIGNORS TO GENERAL ELECTRIC COMPANY, A CORPORATION OF NEW YORK

OIL-PURIFICATION PROCESS

No Drawing.　　Application filed October 29, 1928. Serial No. 315,921.

The present invention relates to the purification of mineral oil and is applicable both to the refining of crude mineral oil and to mineral oil which has become sludged during use at high temperature for a protracted length of time. It is especially applicable to the preparation of electrically insulating and impregnating oil, for example the oil which constitutes a cooling and insulating medium in such devices as electric transformers, capacitors, oil switches and electric cables, but is also applicable to mineral oil suited for lubricating or other purposes.

The crude oil and the crude oil distillate, which is obtained by the fractional distillation of petroleum, contain various substances, believed to be unsaturated hydrocarbons or hydrocarbon derivatives which would be very quickly oxidized during use of the oil to produce sludge and also acid and asphaltic bodies which would render the oil less efficient or entirely unfit for use. Mineral oil even when freed from such substances is gradually broken down chemically through protracted use, and a dark sludge is formed in the oil which is less fluid than the oil, and in some cases may be semi-solid. Sometimes the oil becomes contaminated by the solution therein of some of the varnish insulation in the electric devices.

Heretofore, it has been usual practice to refine crude oil, and in some cases to reclaim used oil, by treatment with sulphuric acid, thereby causing the oxidizable, or the oxidized products, to become sulphonated. The sulphonated products can be separated from the oil together with uncombined acid. This process is not only troublesome and wasteful of oil but also requires great care subsequent to its use to remove traces of free acid and acidic products from the oil.

In accordance with our invention crude mineral oils and also sludged mineral oils are purified by bringing the oil in intimate contact with a liquid solvent for said impurities which does not chemically attack the oil, said solvent either being originally insoluble in the oil or being capable of being rendered insoluble in the oil, the impurities thereby being transferred from the oil to the solvent material.

Our invention is susceptible of being practiced with various solvent materials which in general fall into two main classes, namely extraction of oil with esters of organic or inorganic acids which esters are capable of being rendered insoluble in the oil either in a preliminary purification process or during the use of the oil, and extraction with polyhydric alcohols which inherently are but slightly soluble or are insoluble in the oil. The removal of impurities from mineral oil by a body of polyhydric alcohol in contact with such oil is described and claimed in a United States Patent 1,776,309, issued September 23, 1930, in the name of Frank M. Clark.

One of the most advantageous solvents of the ester group for carrying out our invention is tricresyl phosphate, which is a heavy, colorless liquid having good dielectric properties. This solvent is particularly suitable for the purification of mineral oil which is to be used for electrical insulating purposes in a transformer, circuit breaking device, capacitor, or other electrical apparatus, as this solvent is itself an electrical insulator. Furthermore, as the tricresyl phosphate is soluble to the extent of 25 to 30% by volume in new or unused mineral oil and becomes progressively insoluble as the mineral oil becomes oxidized or sludged, it is advantageous in some cases to operate a mixture of mineral oil and tricresyl phosphate in an electrical apparatus, the phosphate falling out of solution when it becomes associated with an appreciable amount of oxidation products from the oil, thus purifying the oil automatically during use.

When a solvent ester, such as tricresyl phosphate, is used to purify either unrefined or sludged oil in a preliminary purification process the phosphate is first mixed with about equal parts by volume of a suitable precipitant, such as glacial or commercial concentrated acetic acid or an alcohol, such as ethyl alcohol either pure or admixed with methyl alcohol. The mixture of these two classes of substances is only very slightly soluble in mineral oil but is a solvent for the impurities originally associated with unrefined oil and also for the oxidation products formed in the oil during use. About 70 to 90 parts of the unrefined or sludged oil are agitated with about 30 to 10 parts by volume of the above mixture, the most favorable ratio of oil and purifying liquid depending on the degree of contamination of the oil. After the oil and purifying liquid have been brought into intimate contact by agitation, the mixture is allowed to stand until by gravity the separation of the oil and the purifier has taken place. Most commonly two layers are formed, a mixture of tricresyl phosphate and precipitant being at the bottom, and an oil layer on the top, but in some cases an intermediate third layer is formed which consists largely of water. In either case the liquid below the oil layer is withdrawn and the oil is then washed with water. A small amount of sodium hydroxide, or other alkaline substance, is used with the initial washings when acetic acid is employed in order to obtain a neutral reaction in the oil layer.

The oil thereupon is distilled preferably, but not necessarily, in a vacuum. The object of the distillation is to remove small amounts of tricresyl phosphate and precipitant which tend to persist in the oil even after gravity separation and washing. The precipitant present will ordinarily be associated with the first fraction and the tricresyl phosphate will remain behind in the still when the process is used for purifying the light mineral oil which is commonly used for electrical transformers. The purified oil then will constitute an intermediate fraction. When our improved procedure is used for the purification of a heavier mineral oil, such as is used for lubricating purposes, or if a nonvolatile precipitant is used then the schedule of fractional separation may be varied accordingly. In some cases an oil may require repeated extractions.

The tricresyl phosphate which is removed from the oil, either during the first gravity separation step or subsequently by fractional distillation, is reclaimable for subsequent use with our improved process by known purification methods.

In some cases tricresyl phosphate may be agitated with the oil unmixed with a precipitant, and the precipitant may be added later and brought into intimate contact with the oil by agitation.

Our invention may be practiced in a similar way by the use of other solvents of the ester type, as for example, dibutyl tartrate and dibutyl phthalate, acetic acid or alcohol being added as in the above example to produce a solvent mixture which is substantially insoluble in mineral oil. These esters also are dielectric liquids and hence some of the esters may be, without disadvantage, allowed to remain in insulating oil.

The extraction of impurities from either crude or used mineral oil by means of polyhydric alcohol is covered by United States Patent 1,776,550, issued September 29, 1929, 1930, filed as a division of the present application.

As already indicated above, in accordance with one embodiment of our invention, the extraction solvent may be placed in contact with the oil contained in a transformer or other electrical device. For this purpose, a suitable amount of an extraction solvent, say 5 to 15 per cent. by volume, is either dissolved in the oil originally, or is placed in the oil container beneath the body of oil. Impurities become associated progressively by the extraction solvent, thus keeping the oil in condition satisfactory for use.

The oil purified in accordance with our invention is characterized by increased stability when operated at elevated temperature, that is, the electrical insulating characteristics are longer maintained and sludge formation is delayed. Even when sludge does appear therein its accumulation is very slow.

What we claim as new and desire to secure by Letters Patent of the United States, is,—

1. The process of purifying insulating and lubricating mineral oils containing impurities which consists in extracting said impurities with a mixture of a liquid solvent for said impurities and a reagent capable of rendering said solvent substantially insoluble in said oils.

2. The process of purifying insulating and lubricating mineral oils containing impurities which consists in bringing said oil into intimate contact with a solvent which is liquid under normal conditions and comprising an ester having dielectric properties, and a precipitant therefor, thereby extracting said impurities by solution in said ester solvent and subsequently separating the purified oil from the extraction agent.

3. The process of purifying mineral insulating and lubricating oil containing substances deleterious to the use of said oil for insulating purposes which consists in extracting the impurities from said oil by means of phosphate ester which is neutral chemically with respect to said oil said ester being admixed with a substance capable of rendering said ester substantially insoluble in said oil.

4. The process of purifying mineral oil containing sludge formed during use at high temperatures which consists in extracting said sludge by means of a solvent reagent which is neutral chemically with respect to said oil, which is a good dielectric and which is substantially insoluble in said oil, and separating said reagent together with said sludge from the purified oil.

5. The process of purifying mineral insulating and lubricating oil containing dissolved impurities which consists in extracting said oil by means of tricresyl phosphate, and separating said phosphate together with said impurities from said oil.

6. The process of purifying mineral oil containing dissolved impurities which consists in extracting said impurities by means of tricresyl phosphate, precipitating said phosphate with acetic acid and finally freeing said oil from traces of said phosphate and acetic acid by distillation.

7. The process of purifying insulating oil during use in electrical apparatus which consists in initially dissolving in said oil prior to use a phosphate ester which by association with oxidation products formed in the oil during use becomes insoluble in the oil, and separates therefrom together with said products.

8. The process of purifying mineral oil during use in electrical apparatus which consists in dissolving in the unused oil a neutral, dielectric ester which becomes insoluble in the oil as the oxidation progresses, and which separates eventually from the oil carrying with it oil oxidation products.

9. The process of purifying an oil during use in an electrical apparatus which process consists in dissolving therein a substantial quantity of tricresyl phosphate which becomes insoluble as the oil oxidation progresses and finally separates from the oil carrying with it the dissolved oxidation products.

In witness whereof, we have hereunto set our hands this twenty-sixth day of October, 1928.

FRANK M. CLARK.
ARTHUR T. HARDING.